US009081151B2

(12) United States Patent
Chen et al.

(10) Patent No.: US 9,081,151 B2
(45) Date of Patent: Jul. 14, 2015

(54) OPTICAL CONNECTOR ASSEMBLY

(71) Applicant: Amphenol Corporation, Wallingford Center, CT (US)

(72) Inventors: Min Chen, Foshan (CN); Anh Ngoc Nguyen, Carrollton, TX (US); Darijus Baltrukonis, Naperville, IL (US)

(73) Assignee: Amphenol Corporation, Wallingford Center, CT (US)

( * ) Notice: Subject to any disclaimer, the term of this patent is extended or adjusted under 35 U.S.C. 154(b) by 0 days.

(21) Appl. No.: 13/628,787

(22) Filed: Sep. 27, 2012

(65) Prior Publication Data
US 2013/0148927 A1 Jun. 13, 2013

Related U.S. Application Data

(60) Provisional application No. 61/539,961, filed on Sep. 27, 2011, provisional application No. 61/540,398, filed on Sep. 28, 2011.

(51) Int. Cl.
*G02B 6/26* (2006.01)
*G02B 6/36* (2006.01)
(Continued)

(52) U.S. Cl.
CPC *G02B 6/36* (2013.01); *G02B 6/262* (2013.01); *G02B 6/3878* (2013.01); *G02B 6/14* (2013.01); *G02B 6/3636* (2013.01); *G02B 6/387* (2013.01);
(Continued)

(58) Field of Classification Search
CPC ... G02B 6/3887; G02B 6/3878; G02B 6/3879
See application file for complete search history.

(56) References Cited

U.S. PATENT DOCUMENTS

| 4,047,797 | A | | 9/1977 | Arnold et al. | |
|---|---|---|---|---|---|
| 4,611,887 | A | * | 9/1986 | Glover et al. | 385/71 |
| 5,231,685 | A | | 7/1993 | Hanzawa et al. | |

(Continued)

FOREIGN PATENT DOCUMENTS

| EP | 0 147 231 A2 | 7/1985 |
|---|---|---|
| EP | 1 315 991 B1 | 8/2007 |

OTHER PUBLICATIONS

International Search Report and Written Opinion for International Application No. PCT/US2010/057935, dated Feb. 11, 2011.
(Continued)

*Primary Examiner* — Omar R Rojas
(74) *Attorney, Agent, or Firm* — Wolf, Greenfield & Sacks, P.C.

(57) ABSTRACT

An optical connector for reducing attenuation in a cable assembly. A support within the connector precludes bending of exposed fiber within the connector that might otherwise occur when the cable assembly is exposed to environmental conditions involving cyclic temperatures. In some embodiments, optical connector assemblies include an optical fiber jacket surrounding a plurality of optical fibers and a support member adjacent to the jacket. The support member includes channels for receiving regions of the optical fibers that are exposed exterior to the optical fiber jacket. The channels of the support member serve to prevent severe bending of the optical fibers which otherwise would give rise to significant signal attenuation. For multi-fiber optical connector assemblies described herein, even during harsh environmental conditions, the signal loss in the optical fibers may be less than about 0.5 dB. The support may be formed as an extension of a ferrule holder.

33 Claims, 11 Drawing Sheets

(51) Int. Cl.
  *G02B 6/38* (2006.01)
  *G02B 6/14* (2006.01)
(52) U.S. Cl.
  CPC ......... *G02B 6/3887* (2013.01); *Y10T 29/49826* (2015.01)

(56) References Cited

U.S. PATENT DOCUMENTS

| | | | |
|---|---|---|---|
| 6,062,739 | A | 5/2000 | Blake et al. |
| 6,334,784 | B1 | 1/2002 | Howard |
| 6,485,322 | B1 | 11/2002 | Branch et al. |
| 6,517,382 | B2 | 2/2003 | Flickinger et al. |
| 6,565,264 | B1 | 5/2003 | Johnson et al. |
| 6,769,814 | B2 | 8/2004 | Kiani et al. |
| 6,854,894 | B1 | 2/2005 | Yunker et al. |
| 7,281,856 | B2 | 10/2007 | Grzegorzewska et al. |
| 7,290,941 | B2 | 11/2007 | Kiani et al. |
| 7,591,595 | B2 | 9/2009 | Lu et al. |
| RE42,522 | E | 7/2011 | Zimmel et al. |
| 2003/0123813 | A1 | 7/2003 | Ravasio et al. |
| 2004/0156595 | A1 | 8/2004 | Stockhaus et al. |
| 2006/0045428 | A1 | 3/2006 | Theuerkorn et al. |
| 2007/0036489 | A1 | 2/2007 | Grzegorzewska et al. |
| 2011/0123157 | A1 | 5/2011 | Belsan et al. |
| 2011/0217008 | A1* | 9/2011 | Cline et al. ...................... 385/78 |

OTHER PUBLICATIONS

International Search Report and Written Opinion for International Application No. PCT/US2012/057511 mailed Feb. 7, 2013.
JDSU Communications Modules & Subsystems, "OC-12 Small Form Factor (SFF) Transceiver, CF2 Series", published marketing materials found sat http://www.jdsu.com, dated Aug. 2006, 6 pages.
Molex Sealed SFP Assemblies Integrated Optical and Electrical Receptacles, published marketing materials found at http://www.molex.com, dated Feb. 2007, 2 pages.
JDSU Communications Modules & Subsystems, "OC-12 SFPT Transceiver (Multirate, 1310 nm and 1550 nm), CT2 Series", published marketing materials found at http://www.jdsu.com, dated Sep. 2006, 8 pages.
3 images of JDS transceiver cages, dated Sep. 2005, 3 pages.

* cited by examiner

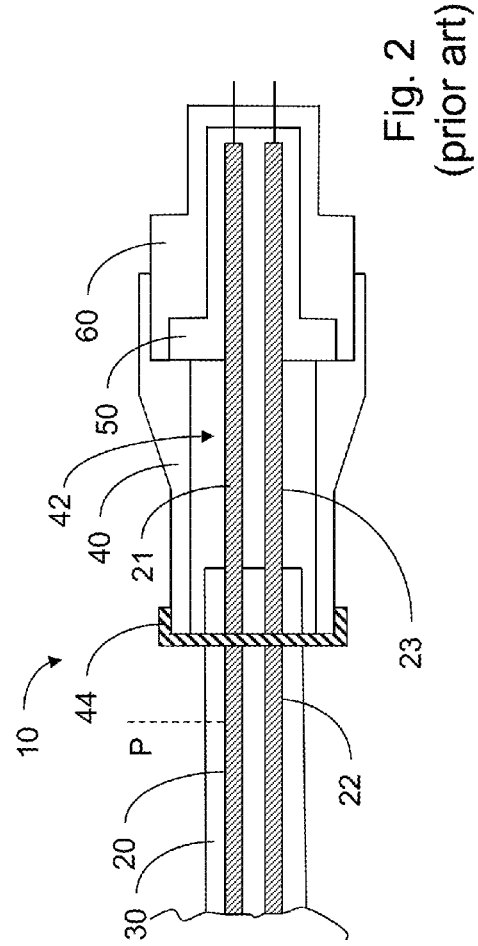
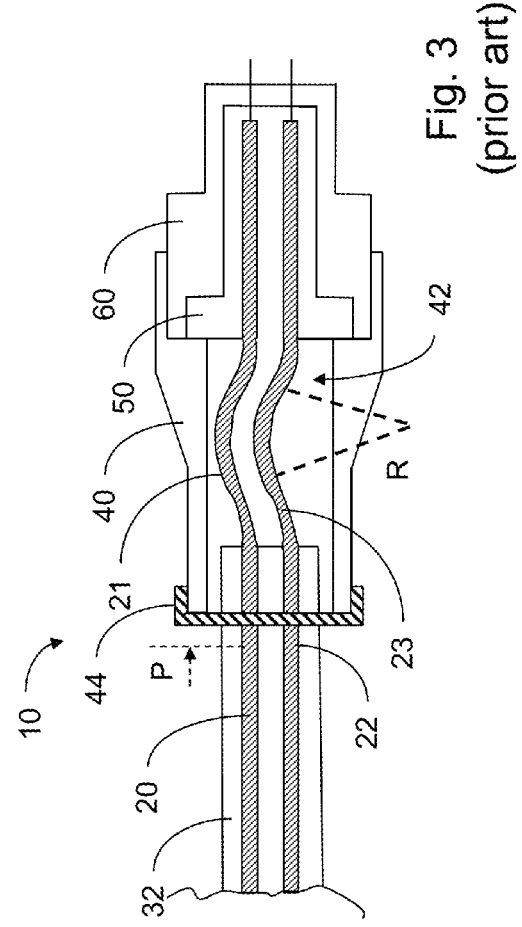

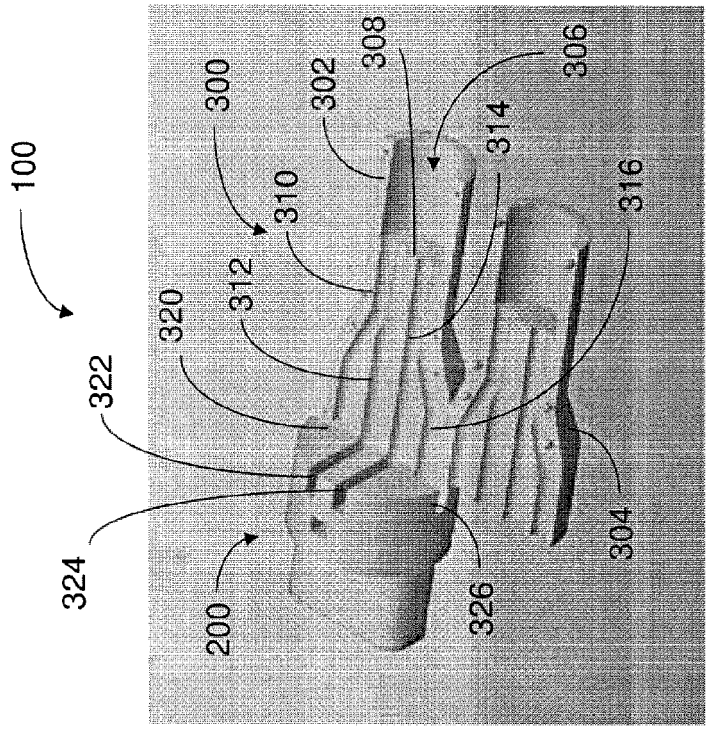
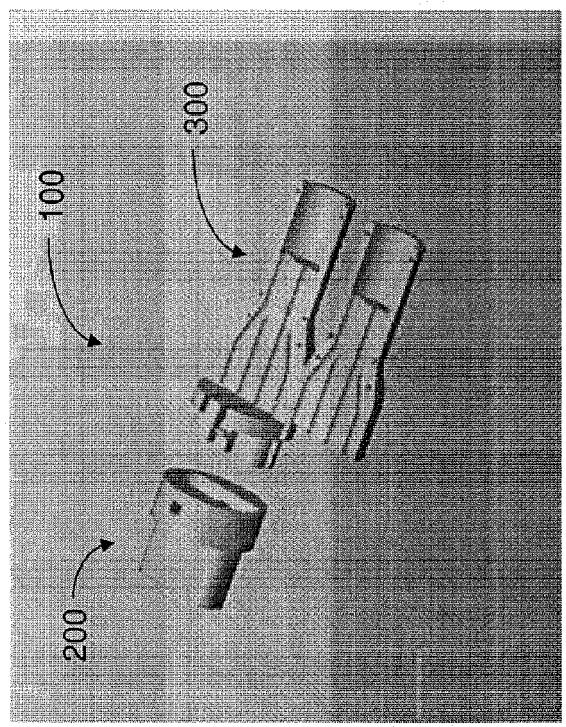
Fig. 4B
Fig. 4A

OPTICAL CONNECTOR ASSEMBLY

BACKGROUND

1. Field of Invention

Aspects described herein relate generally to a method and apparatus for reducing attenuation of light within an optical fiber cable assembly.

2. Discussion of Related Art

Modern life is full of devices that process information in digital form. Computers share digital information over the Internet or other computer networks. Information, such as radio and television signals, that in the past was communicated as analog signals is now frequently digitized and communicated over networks. For example, many homes have a high speed digital connection to a cable company or other service provider.

The increased use of digital information has created a need for reliable interconnection systems that can connect devices and networks that generate or consume digital information. One form of interconnection system employs optical fiber for transmission of digital information. Large amounts of information can be encoded as a light signal, which can then be transmitted over a relatively long distance. Often, optical fibers are used to provide links between electronic devices that are separated by a relatively large distance.

There are two primary ways that an optical fiber loses light between the source and the detector, one being insertion loss which occurs at mating points and the other being attenuation for light loss at non-mating points. Macro-bending occurs when light is lost out of the optical fiber due to sharp bending of the fiber.

SUMMARY

The inventors have recognized and appreciated that attenuation of an optical fiber cable assembly may be improved by use of a support mechanism for optical fibers within an optical connector terminating the cable assembly. Under temperature variation, the outer jacket of the cable has a tendency to shrink, which in turn, causes the optical fiber to be pushed out from the outer jacket and into the optical connector. This effect results in bunching of the optical fiber which leads to undue bending, eventually increasing signal attenuation.

Accordingly, aspects described herein relate to reducing the ability for the optical fiber extending from an optical cable to be bent within the connector in such a manner that leads to a consequential increase in attenuation over the operating temperature of the assembly. In some embodiments, an extension to an internal holding component of a connector may be formed with channels within which optical fibers may be routed and supported. Such an extension functions to support the normally exposed and unsupported fiber length that is disposed between the outer optical fiber jacket structure and an optical ferrule terminating the fiber or a ferrule holder into which such a ferrule is inserted.

In some embodiments, the support member for the optical fibers may be part of or attached to a ferrule holder. Such a support member may encapsulate the majority of or the entire length of an optical fiber between the ferrule and the cable jacket, providing a path for the unsupported fiber to reside while still allowing the fiber to slide axially within the holder. Though, the channels within which the fibers reside provide a barrier to transverse movement which would normally give rise to undue bending of the fibers. In some cases, a surface of the ferrule holder, or other support member, facing the optical fiber jacket abuts a respective surface of the optical fiber jacket or other portion of the optical cable.

As the optical fibers undergo various mechanical or environmental stresses, including those generated as the jacket of the optical fiber cable shrinks, the support member eliminates the ability for the optical fibers to bend excessively, which might otherwise result in an increase in attenuation due to bending. In some cases, the length of the support member occupies a region within the connector housing in which optical fiber are the typically unsupported, creating a guide for the optical fibers.

In an illustrative embodiment, an optical connector is provided. The optical connector includes a connector housing, the housing bounding a cavity, the housing having a first opening into the cavity and a second opening into the cavity; a support disposed within the cavity, the support comprising: a first portion comprising a plurality of ferrule receiving sections, the first portion facing the first opening; a second portion comprising a plurality of channels, each channel having a first end adjacent a ferrule receiving section of the plurality of ferrule receiving sections and a second end facing the second opening.

In another illustrative embodiment, an optical connector assembly is provided. The optical connector assembly includes a connector housing; an optical fiber jacket secured to the connector housing; a plurality of optical fibers, each of the plurality of optical fibers having a region disposed within the jacket and an exposed region, extending from the jacket and disposed within at least a portion of the connector housing; and a support member disposed adjacent to the jacket including a plurality of channels constructed and arranged to receive an exposed region of each of the plurality of optical fibers and prevent the exposed region of the plurality of optical fibers from substantial bending.

In another illustrative embodiment, a method of manufacturing an optical connector assembly is provided. The method includes stripping a portion of an optical fiber cable jacket from to expose a region of each of a plurality of optical fibers in the optical fiber cable; terminating an exposed region of each of the plurality of optical fibers with a ferrule of a plurality of ferrules; placing each of the plurality of ferrules in a ferrule holder and placing the exposed region of each of the plurality of optical fibers in a channel of a plurality of channels of a support member.

In a further illustrative embodiment, a method of operating an optical connector assembly. The method includes transmitting light between ends of a plurality of optical fibers; exposing the plurality of optical fibers to at least 80% of a temperature range between −40 C and 85 C; and preventing substantial bending of the plurality of optical fibers during exposure to the at least 80% of the temperature range between −40 C and 85 C.

Other advantages and novel features of the present invention will become apparent from the following detailed description of various non-limiting embodiments of the invention when considered in conjunction with the accompanying figures and from the claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is a cross-sectional view of another conventional fiber optic assembly;

FIG. 3 is a cross-sectional view of the fiber optic assembly of FIG. 2 having experienced jacket shrinkage;

FIG. 4A is an exploded perspective view of a support member in accordance with some embodiments;

FIG. 4B is a perspective view of the support member of FIG. 4A;

DETAILED DESCRIPTION

Figure 1:
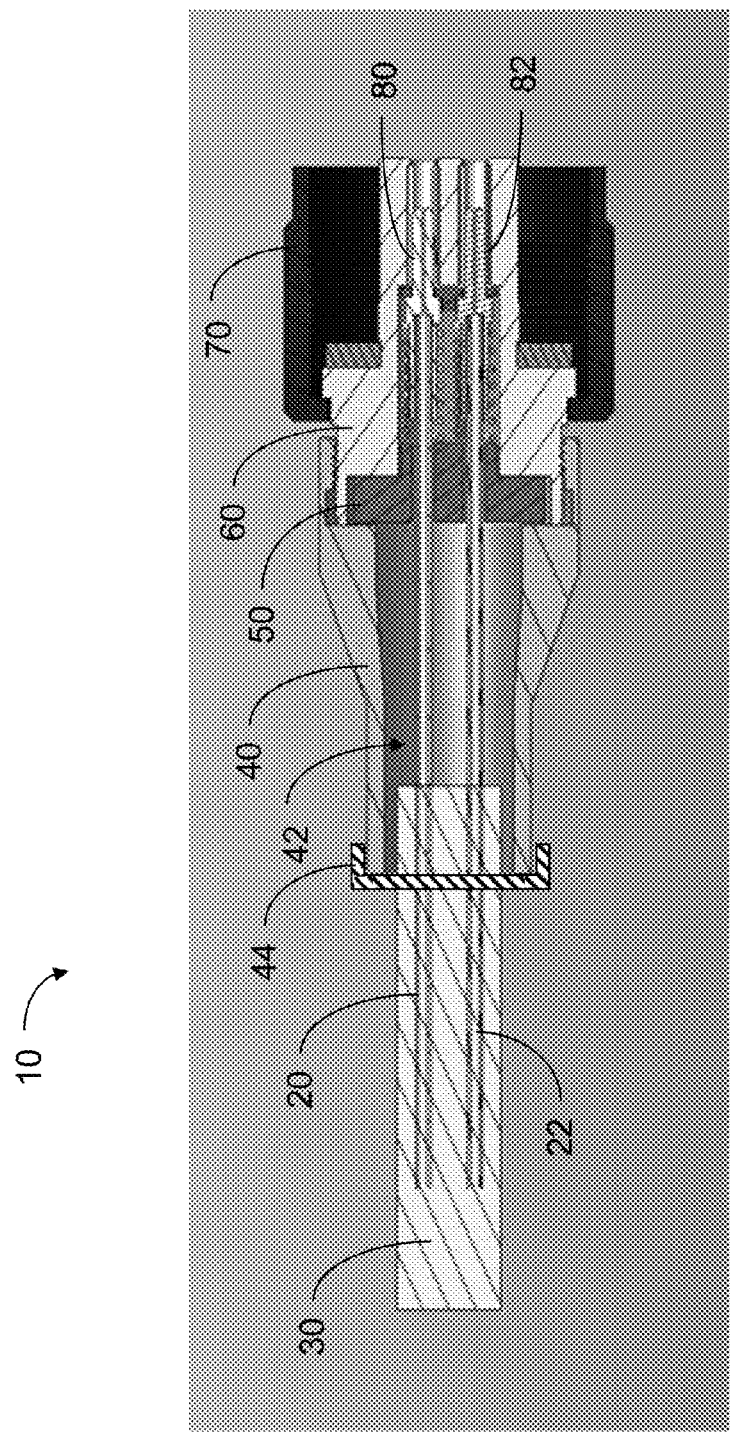
FIG. 1 is a cross-sectional view of a conventional fiber optic assembly.

Optical fiber connections are often placed outdoors and, accordingly, experience wide variations in temperature over the course of their lifetime. The inventors have recognized an appreciated that operation of an optical fiber cable assembly in an environment subject to temperature variations can be improved through incorporation of a support member in a connector terminating the cable assembly. A member, appropriately shaped and positioned within a connector, supporting exposed fibers may reduce attenuation in the cable assembly.

Though not being bound by any particular theory of operation, the inventors believe that such a support member may reduce macrobending, and therefore attenuation, in optical fibers that extend from the protective jacket of the cable to be terminated within a housing of the connector. Such macrobending might otherwise result from different temperature outer jacket of an optical cable experiences shrinkage by a greater amount than the optical fibers. This shrinkage results in the internal optical fiber(s) disposed within the cable being pushed out the end of the jacket. This pushing can be a source of macrobending in a conventional cable assembly.

In a conventional cable assembly, particularly those with multiple fibers, a length of the jacket must be stripped from the fibers. The exposed portion of the optical fibers created by this stripping are then terminated with ferrules, which are mounted in the connector housing. However, some portion of the exposed fibers, often approximately 2 inches, remain in the optical connector. When the optical fiber(s) pushes into the optical connector, the exposed portions of the optical fiber(s) have a tendency to bend in a manner that decreases signal strength.

As a more specific example, most standard fiber optic cables are constructed to include an inner portion that contains the optical fiber, and an outer jacket that contains one or multiples of the inner optical fiber structure. Strengthening elements or yarns are commonly placed between the inner and outer structures to provide improved pulling capabilities, so as not to stretch the inner or outer structure during installation. When terminating the optical cable to an optical connector, the outer jacket structure is typically stripped back to expose the inner structure and the optical fiber, allowing fibers to be stripped and epoxied within the connector. The added length of the optical fiber(s) provides for assembly processes including polishing, testing and final assembly of the optical fiber(s) and the optical connector. The outer cable structure is secured to the outer portion of the connector housing, typically with a mechanical crimp, to isolate the unsupported inner structure from bending and pulling stresses normally observed during handling or installation of the cable assembly. While this method is generally able to support the fiber and eliminate movement of the fibers within the internal portions of the connector housing, it does leave a length of the internal optical fiber structure exposed outside the jacket and unsupported within the housing. At ambient temperatures, this method may exhibit suitable performance characteristics as designed and is commonly used in the industry.

However, the inventors have found through subsequent environmental and mechanical testing that in some cases, where completed assemblies have been tested under severe thermal conditions, the polymer materials used for the outer cable structure is subject to shrinkage, up to 5% in various dimensions (e.g., width, length, volume, etc.) per industry standards. While this is usually not an inherent issue with the cable itself being used in normal operating environments, issues arise when the cable is fixed on one or both ends to optical connectors. Due to size and materials used, the internal structure of optical fiber typically does not shrink as much as the outer structure over the same conditions.

The inventors have found in various evaluations that cable jacket shrinkage can cause the internal optical fiber structure to be pushed into or bunched up within the rear portion of the connector housing leading to undue optical fiber bending. The above described optical fiber bending may give rise to macro-bending of the bent fibers and poor performance results over the temperatures being tested. The results also show that shrinkage and fiber bending is proportional to temperature with cold temperatures more severely impacting optical loss readings.

The inventors have recognized and appreciated that by supporting the exposed optical fibers within the connector housing, though the differential contraction may still occur, the optical fibers tend not to be pushed out of the cable jacket into any cavities in the connector housing. Rather, the difference in length between the fiber and the jacket is absorbed by a serpentine shape within the cable itself rather than by bending within the connector. As a result, the difference in length can be absorbed over a much longer length, leading to a much larger bend radius. For example, the difference in length between the fibers and cable jacket may be distributed over the length of the cable, which may be many meters or more. In that scenario, the bend radius of the fiber is much larger than if the fiber were bent to absorb the same length difference of the smaller unsupported length within the connector, which may be on the order of 2 inches, for example.

A support member may allow the fibers to slide generally along the elongated axis of the fiber. In this way, compliant motion of the ferrules in the connector may be permitted. However, the support member may restrain motion in directions transverse to the axis, such that only slight bending, with a bend radius above the minimum bend radius of the fiber. An example of a suitable support member is illustrated below. Though, FIGS. 1-3 first illustrate scenarios in which attenuation can arise in a conventional connector assembly.

FIG. 1 illustrates a cross-sectional view of an optical connector assembly 10 having cable, which in this example is shown to include two optical fibers 20, 22 surrounded by an optical fiber jacket 30. During assembly, the optical fiber jacket 30 is pulled back (e.g., stripped) so as to expose portions of the optical fibers 20, 22. The exposed portions of the optical fibers are each terminated with a ferrule 80, 82. The ferrules are placed within a ferrule holder, which here has a front portion 60 and a rear portion 50. The ferrules 80, 82 may be spring mounted in such a ferrule holder as is known in the art. Components of a housing, such as connector housing 40 and nut 70, may support the ferrule holder and provide a mechanism for attaching the plug to a mating receptacle.

Prior to placement of the optical fibers within the ferrule, the ferrules 80, 82 may be filled with an adhesive material, such as epoxy, so that the optical fibers are held in place upon engagement. Once the optical fibers are firmly secured within the ferrule, overhanging ends of optical fibers are cleaved through processing methods known in the art. For example, such cleaving may be followed by a polishing step. Conventional processing, particularly for a multi-fiber connector, requires that at least about 2 inches of fiber be exposed by the stripping operation.

To complete the cable assembly, the terminated fibers may be mounted in the ferrule holder, which is then inserted in the housing 40. The optical fiber jacket 30 may be crimped together with a connector housing 40 with a crimp ring 44 which securely holds the components together as a unit. The exposed portions of the fibers are positioned within cavity 42 within the connector housing 40. This cavity allows the exposed portions of the fibers to move, allowing the ferrules to slide within the ferrule holder.

As illustrated, the cavity 42 within the connector housing 40 has a larger inner diameter than the inner diameters of regions within the optical fiber jacket 30 where the optical fibers reside. In some cases, the cavity may also hold a material such as aramid yarn that provides strength in tension to the cable, but is exposed with the jacket is stripped, or the cavity may be filled with a gel for preventing water penetration. While the cavity 42 may contain certain materials, the optical fiber(s) are not constrained and are still able to move and bend within the cavity. The connector housing 40 may be attached to the optical fiber jacket 30 through a crimp ring 44, or any other suitable attachment method. As such, when crimped together, the connector housing and optical fiber jacket are generally rigidly disposed together.

Under ambient conditions, the optical connector assembly 10 functions within working parameters. However, when subject to temperature cycling, particularly lower temperatures, the optical fiber jacket is prone to shrinkage relative to the optical fibers. Such an effect is likely to arise, in large part, due to the material differences between the optical fiber jacket and the optical fibers themselves. The optical fibers, often made from glass (e.g., silica) are significantly less prone to shrinkage than the material comprising the optical fiber jacket, such as a polymer (e.g. acrylate polymer, polyimide, etc.). Accordingly, during temperature cycling, the optical fibers generally remain at a constant length while the optical fiber jacket disposed around the optical fibers experiences temperature displacement.

FIG. 2 depicts an illustrative embodiment of an optical connector assembly 10 similar to the embodiment of FIG. 1 prior to substantial temperature cycling and, hence, prior to shrinkage of the optical fiber jacket 30. A reference point P is provided on the optical fiber 20. Once the optical connector assembly has been subjected to temperature cycling, the optical fiber jacket shrinks, resulting in movement of the reference point P on the optical fiber 20 and further fiber being exposed in regions 21, 23, shown in FIG. 3. The shrinking optical fiber jacket 32 is crimped to the connector housing 40, effectively pushing optical fibers 20, 22 from the jacket further into the cavity 42 toward the ferrule and main connector. Accordingly, the exposed length of the optical fibers within the cavity 42 increases. The optical fibers pushed from the jacket and into the cavity 42 are subject to bending as they bunch together.

FIG. 3 illustrates the bending effect on regions 21, 23 of the optical fibers. In an un-bent fiber, light will propagate along the length of the fiber, reflecting off the interior walls of the fiber. So long as the light reflects within the fiber, the loss is low. However, if light, rather than reflecting to stay within the fiber, passes outside of the fiber, the amount of light traveling through the fiber decreases, creating attenuation. If the fiber is bent too much, light, rather than reflecting to stay within the fiber will pass out of the fiber, This condition is called macrobending.

As shown, certain portions of the optical fibers exhibit a bending radius R. As the bending radius R decreases, attenuation of the optical fibers increases. When the bending radius R is below a certain threshold, macro-bending is said to occur, resulting in significant attenuation of the optical fiber(s).

As the optical connector assembly is exposed to extreme weather conditions, the assembly is constantly cycled between cold and hot temperatures, resulting in continual shrinkage and expansion of the optical fiber jacket. Shrinkage of the jacket may cause bending of the fibers in regions 21 and 23 that causes attenuation. Over time, the optical fiber jacket typically shrinks more than expands, giving rise to increased light loss, trending to greater degrees of attenuation over continued cycles.

The inventors have recognized and appreciated that it would be advantageous to reduce the bending to occur at any one location along the length of the optical fibers in an optical connector assembly. Accordingly, in some embodiments, a support member is provided to support the exposed fiber in cavity 42. In some embodiments, support may be provided by a support having an extension located between the ferrule and the optical fiber jacket. The support member may have channels to prevent excessive bending of optical fibers at regions located within the support member. In some embodiments, the support member may function as a ferrule holder. In effect, the support member may serve to reduce bending at any one location along an optical fiber and, instead, distribute the bending along greater lengths of the optical fiber (e.g., the entire length of the optical fiber).

The support member may provide channels through which optical fibers may slide axially, yet are constrained transversely. For example, the optical fibers may slide within the channels as the optical connector is mated, yet the channels may also be tight enough to accommodate and take on any load transferred from the outer jacket, or other portions of the cable, that pushes the internal optical fibers toward the connector. Accordingly, guidance of the optical fibers by the walls of the channels in the support member substantially reduce the ability for the optical fiber(s) disposed within the channel to undergo bending that can give rise to attenuation.

In various embodiments, an optical connector may include a connector housing that surrounds a cavity where the housing has different openings that lead into the cavity. For example, one opening may receive a cable. Another cable may forming a mating interface in which the terminated fibers can be accessed for mating to another connector.

The optical connector may include a support member that has a number of sections for receiving a ferrule. The support member may also include a number of channels that lead to the sections for receiving a ferrule. The optical connector may be incorporated in an optical connector assembly. Such an assembly may include an optical fiber jacket secured to the connector housing and surrounding a plurality of optical fibers. Each of the optical fibers may have a region disposed within the jacket in addition to an exposed region that extends from the jacket while still disposed within a cavity of the connector housing. The channels of the support member may be constructed so as to prevent the exposed region of the optical fibers from substantial bending arising from shrinkage of the outer jacket.

Optical connector assemblies may incorporate any suitable optical fiber having an appropriate size. In some embodiments, optical fibers used in optical connector assemblies described herein have an outer diameter of less than about 3 mm, between about 100 microns and about 1.5 mm (e.g., about 900 microns, about 1.2 mm), or between about 500 microns and about 1.2 mm. As an example, a 900 micron optical fiber, as is known in the art, having a buffered jacket may be a suitable optical fiber for use in optical connector assemblies provided herein.

Channels may also have any suitable diameter, for example, less than about 2 mm, less than about 1.5 mm, or less than about 1 mm. Though, the channels may have an inside diameter sized to accommodate a specific sized fibers. The inside diameter of the channels may be on the order of 100 microns or 200 microns larger than the outer diameter of the fiber. In some embodiments, channels of the optical connector assembly may accommodate for a maximum bend radius of an optical fiber of more than 2 mm, more than 5 mm, or more than 8 mm. Accordingly, such a channel may have a diameter that is on the order of 2 mm greater than the diameter of the fiber.

Any suitable number of optical fibers may be incorporated in an optical connector assembly. For example, multi-fiber optical connector assemblies are described, having an even or odd number of optical fibers. In some embodiments, at least two or at least four optical fibers are provided in an optical connector assembly.

FIGS. 4A-4D illustrate a support member 100 which includes a ferrule holder. In this example, the support member for the optical fibers is formed as an extension of a ferrule holder. As a result, the support member may be molded of plastic or other suitable material conventionally used in making a ferrule holder. Making the support member in this way may limit the number of components within the connector, but is not a requirement of the invention.

In this example, the support member, has a front portion 200 and a rear portion 300. The front portion 200 acts as a point of connection that accepts one or more optical ferrules. In this regard, for some embodiments, the support member may function as a ferrule holder where a spring is mounted between the ferrule and the ferrule holder, as is known in the art to facilitate mating.

The rear portion 300 serves to capture the optical fibers that are ferruled within the connector. As illustrated, the rear portion 300 includes a first portion 302 and a second portion 304 that are provided in a clam-shell arrangement where the second portion 304 folds over and attaches together with the first portion 302 with an attachment mechanism (e.g., snap-fit, interference fit, etc.) to form channels 310, 312, 314, 316 within the rear portion. As shown, the support member 100 includes channels that may accommodate and route four respective optical fibers within the channels. The rear portion 300 includes a number of slots 320, 322, 324, 326 that are constructed to align with the channels 310, 312, 314, 316. Slots 320, 322, 324, 326 are each configured to receive a ferrule. In this way, a terminated fiber may be laid in a channel and the ferrule terminating the slot may be inserted into a corresponding slot.

Figure 4C:
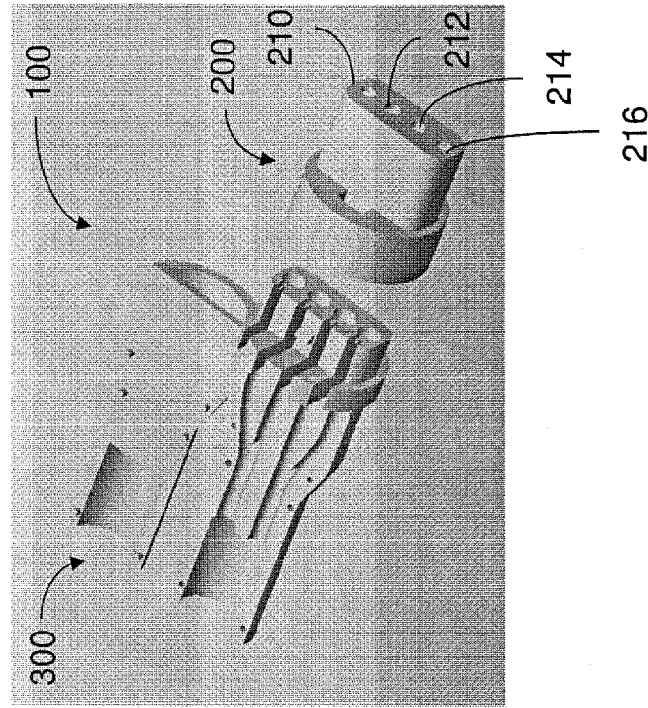
FIG. 4C is a perspective view of the support member of FIG. 4A.
Figure 4D:
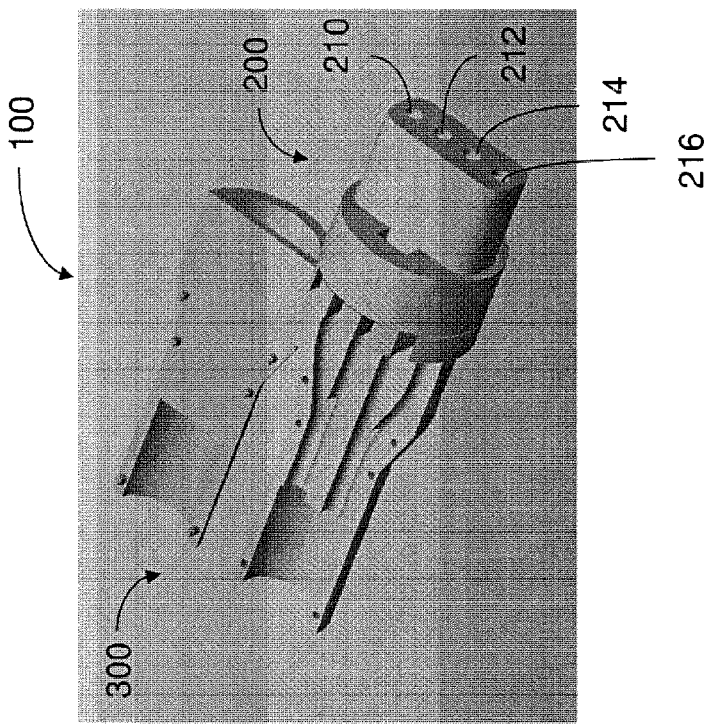
FIG. 4D is an exploded perspective view of the support member of FIG. 4A.

In some embodiments, the front portion 200 includes slots that correspond to Slots 320, 322, 324, 326, allowing the ferrules to be exposed through a face of front portion 200. FIGS. 4C and 4D illustrate openings 210, 212, 214, 216 of the front portion 200 where optical fibers disposed along channels 310, 312, 314, 316 are exposed for mating.

In making a cable assembly, a support member as illustrated in FIGS. 4A-4B may be simply incorporated. Terminated fibers may be placed in the channels. The ferrules terminating the fibers may be placed in the slots. Portions 302 an 304 may be affixed together. Front portion 200 may be attached to rear portion 300 to hold the ferrules in place.

Referring back to the embodiments of FIGS. 1-3, upon installation of the support member within the assembly, a substantial portion of the support member 100 resides within the cavity 42 of the connector housing 40. In some embodiments, optical fibers exposed from an outer jacket are inserted into a receiving cavity 306 of the support member which accepts a front connection portion of the optical fiber jacket. The optical fibers may be positioned within corresponding channels of the support member and the surface 308 of the support member may abut against a respective front surface of the optical fiber jacket or other suitable portion of the cable. The surface 308 acts as a stopping point for the cable. This stopping feature allows for the cable to be further aligned with the connector, aiding in proper and reliable optical connector assemblies to be consistently manufactured. Such a feature, for example, may reduce the likelihood that there will be spacing between the support member and the cable where fiber, which could bend, is exposed. In some embodiments, the surface 308 comes into flush contact with a front surface of the optical fiber jacket. However, in other embodiments, the support member of a suitable optical connector assembly is disposed adjacent to an optical fiber jacket without abutting or coming into flush contact with a surface of the optical fiber jacket.

Regardless of the specific structure, when assembled, the optical fibers are laterally supported by channels of the support member in the region between the optical fiber jacket and the ferrule so that bending of the optical fibers is obstructed. The channels within the support member may accommodate some bending of the optical fibers, for example, bending so as to resemble a sinusoidal wave—though of a relatively long spatial period such that the fiber experiences only gentle curves. Accordingly, the channels serve to reduce significant macro-bending type behavior in the optical fibers that would otherwise arise if the support structure provided by the channels were absent.

The plurality of channels have walls that prevent substantial bending of the optical fibers disposed within the channels such that the bending radius R at any point along the optical fiber is kept to an amount less than about 10 times of the outer diameter of an optical fiber. For example, if the outer diameter of an optical fiber is 900 microns, the plurality of channels are suitable to prevent bending of the optical fiber to achieve a bending radius that is less than about 9 mm.

Figure 5:
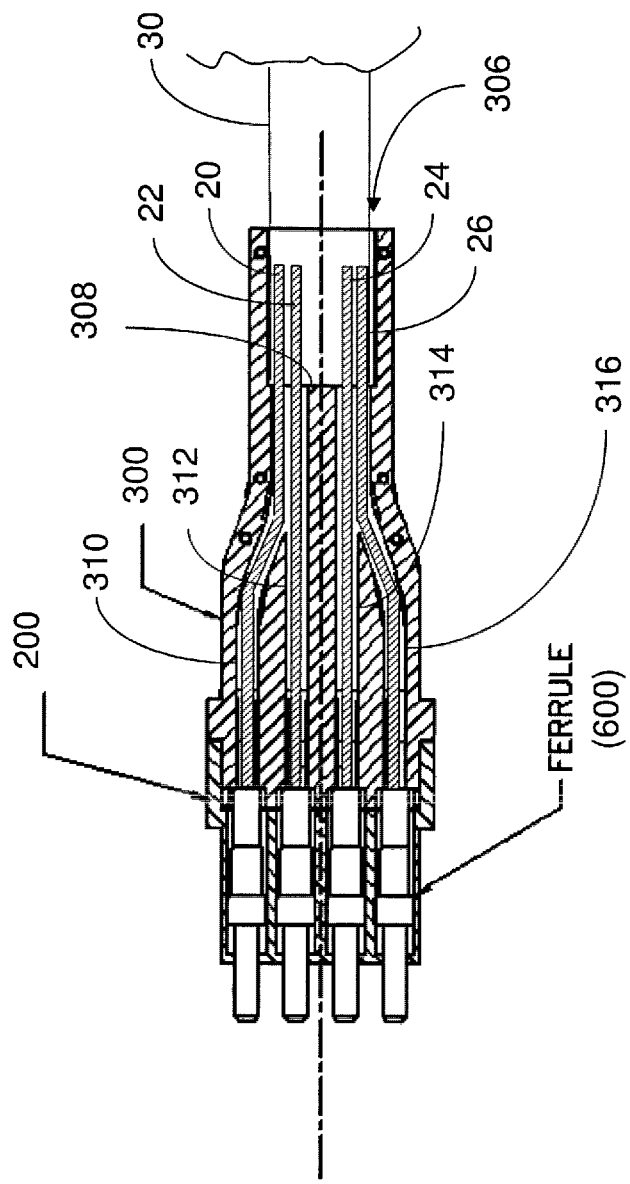
FIG. 5 is a cross-sectional view of an optical connector assembly in accordance with some embodiments.

FIG. 5 illustrates in cross section a support member including a front portion 200 and a rear portion 300. Front portion 200 is connected to a ferrule 600. Rear portion 300 includes channels 310, 312, 314, 316 that are built to receive respective optical fibers 20, 22, 24, 26. As shown, the optical fibers with the jacket are inserted into the receiving cavity 306 and the front end of the optical fiber jacket 30 comes into contact with the surface 308 of the rear portion 300. The channels of the rear portion 300 guide the optical fibers into the ferrule 600 in forming the optical connection. In various embodiments, and as described further below, once fibers are terminated to the ferrule (e.g., via steps of epoxy cure and polishing), the ferrule may be placed into the rear portion of the support member and optical fibers are routed into the channels within the rear portion. In some embodiments, the ferrule includes a spring as is known in the art for facilitating compliant motion of the ferrules during mating.

Figure 6:
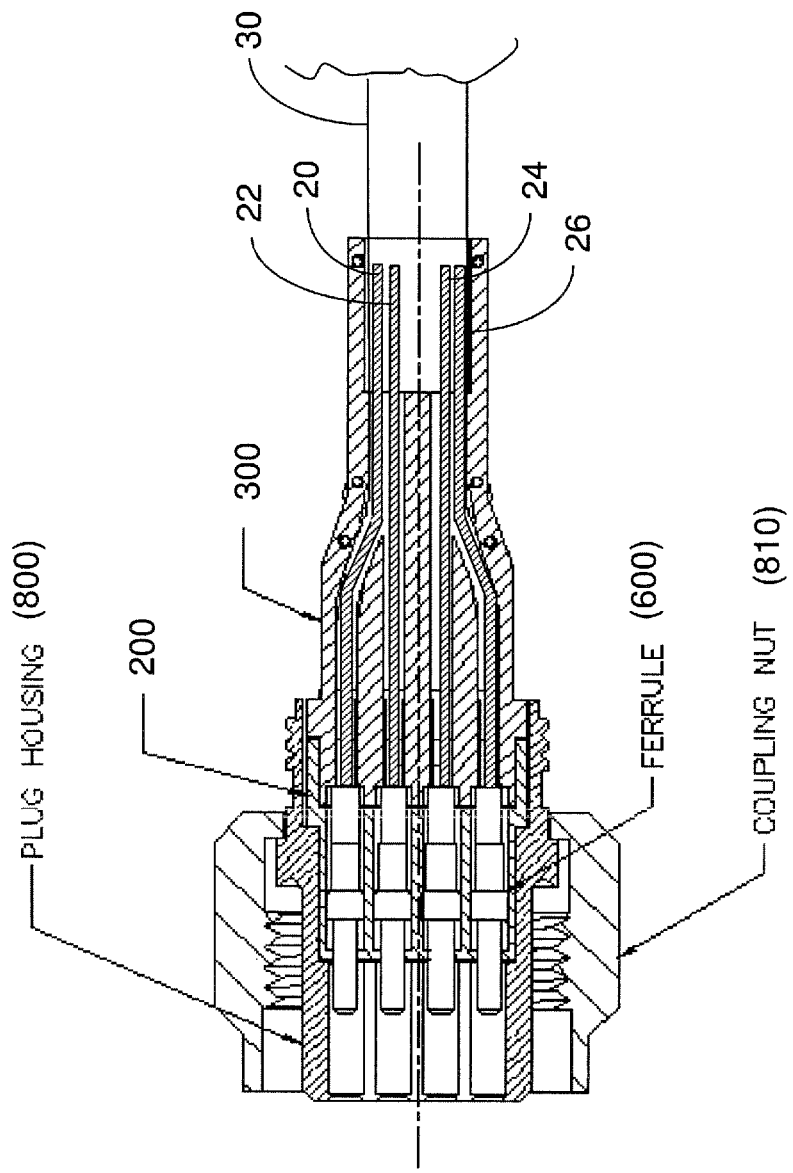
FIG. 6 is a cross-sectional view of the optical connector assembly of FIG. 5 with a plug housing in accordance with some embodiments.

FIG. 6 depicts the front and rear portions 200, 300 of the support member 100 assembled with the ferrule 600 and then inserted into the plug housing 800 which is then covered with a coupling nut 810. The support member and ferrule assembly may be attached to the plug housing 800 through any suitable method, for example, by epoxy or other adhesive, a screw, snap fit, or an interference fit. Similarly, the coupling nut 810 may be placed over the plug housing 800 to facilitate attachment to a receptacle or other optical connector.

Figure 7:
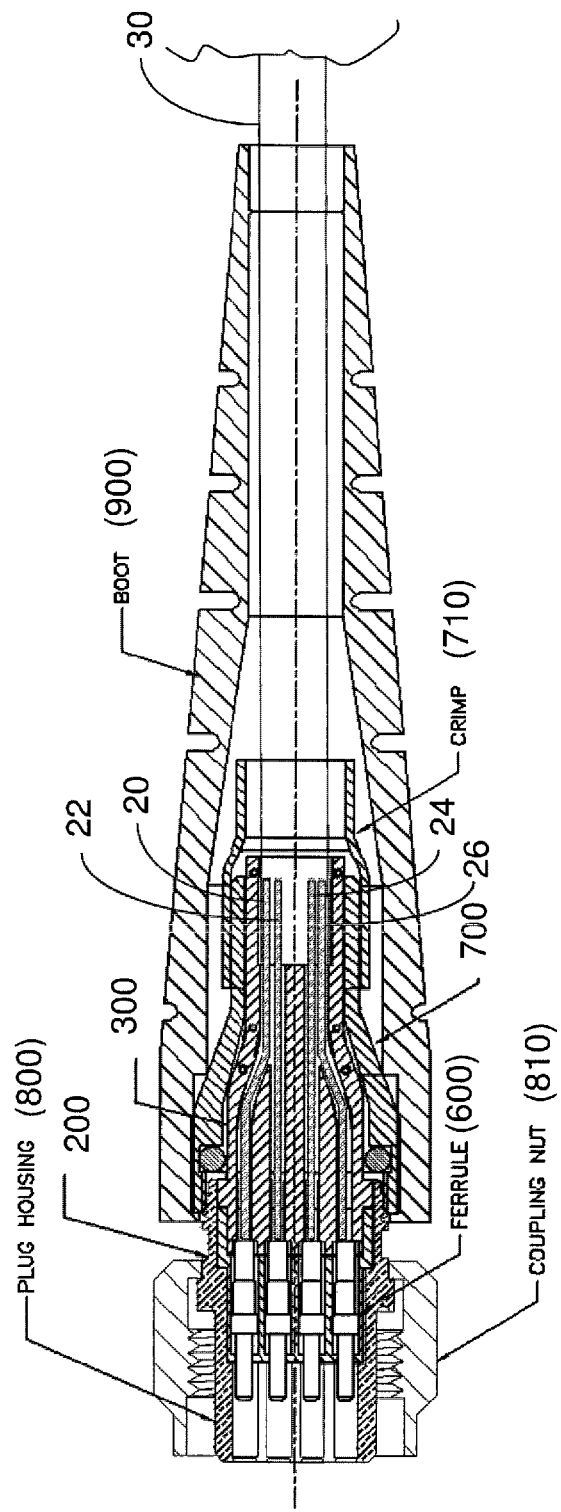
FIG. 7 is a cross-sectional view of the optical connector assembly of FIG. 6 and a boot in accordance with some embodiments.

In some embodiments, as shown in FIG. 7, the connector housing 700 and crimp 710 may be applied to the front and rear portions of the support member 100 and the optical fiber jacket so that the respective components are attached to one another. The connector housing and crimp may function to further secure the support member and the optical fiber together. The crimp may also hold portions of the support member together, instead of or in addition to other attachment mechanisms. In addition, a boot 900 is provided around the support member and the optical fiber jacket. As shown, the boot is installed with the assembly via suitable attachment with the support member. A boot as is known in the art may be used.

As discussed above, optical connector assemblies may incorporate any suitable number of optical fibers. FIGS. 4A-7 illustrate embodiments where the support member includes four channels as pathways for guiding and supporting four corresponding optical fibers to reduce bending effects. FIGS. 8A-11 depict embodiments where the support member includes two channels through which two corresponding optical fibers are disposed, so as to reduce substantial bending of the optical fibers. In some embodiments, although not shown, it is possible for multiple optical fibers to be disposed within a single channel. For example, two or more optical fibers may run through a channel and gain the advantage of not experiencing substantial bending effects so as to give rise to macro-bending in the optical connector assembly.

Figure 8B:
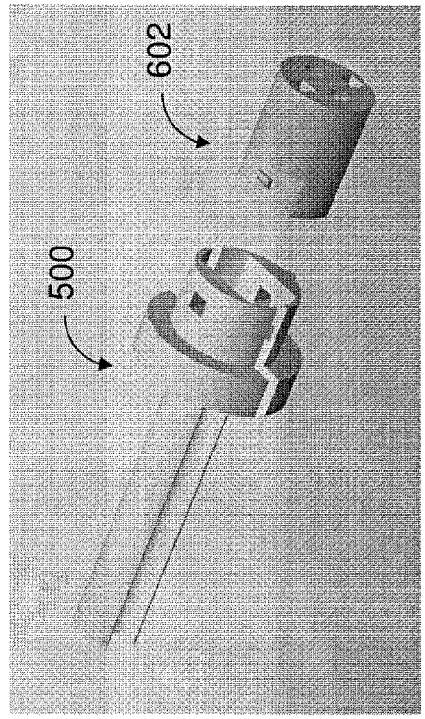
FIG. 8B is an exploded perspective view of the ferrule holder of FIG. 8A.
Figure 8A:
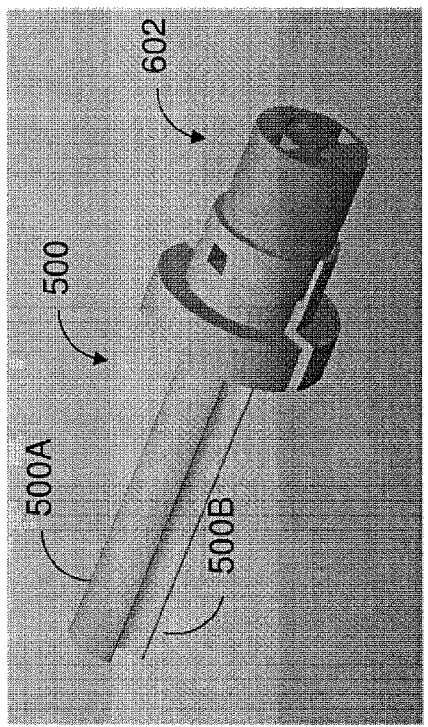
FIG. 8A is a perspective view of a ferrule holder adapted to serve as a support member in accordance with some embodiments.
Figure 9:
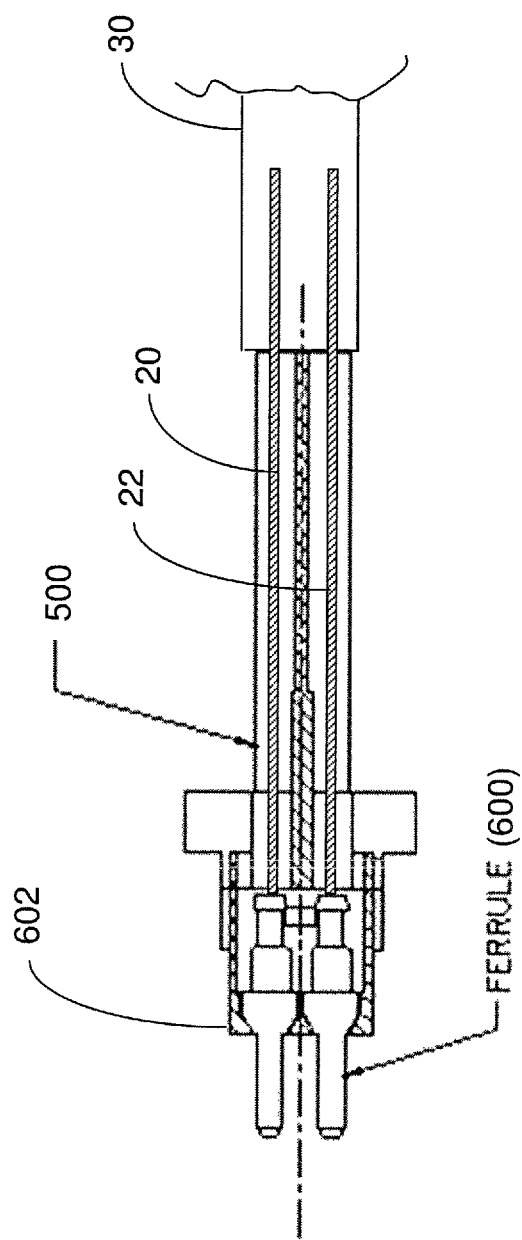
FIG. 9 is a cross-sectional view of an optical connector assembly in accordance with some embodiments.

FIGS. 8A and 8B show a support member 500 including a front portion 602 that captures ferrules within the support. In this example, support member 500 has two portions 500A and 500B. In some cases, where a smaller number of optical fibers are incorporated in the connector assembly, a different design may be preferred. Though, a number of similarities may exist between the embodiments of two-fiber and four-fiber optical connector systems. Moreover, it should be appreciated that both the 2 and 4 fiber configurations illustrated herein are illustrative embodiments, and the techniques used in the various embodiments may be used together in yet further embodiments, As shown in FIG. 9, a cable with an optical fiber jacket 30 houses optical fibers 20, 22 and is inserted into the support member 500. The support member 500 has channels for preventing respective optical fibers from bending in a substantial manner so as to give rise to undue attenuation. The support member 500 and the optical fibers 20, 22 are connected to the front portion 602. The optical fibers may also be installed into the support member, residing and routed within channels of the support member.

Figure 10:
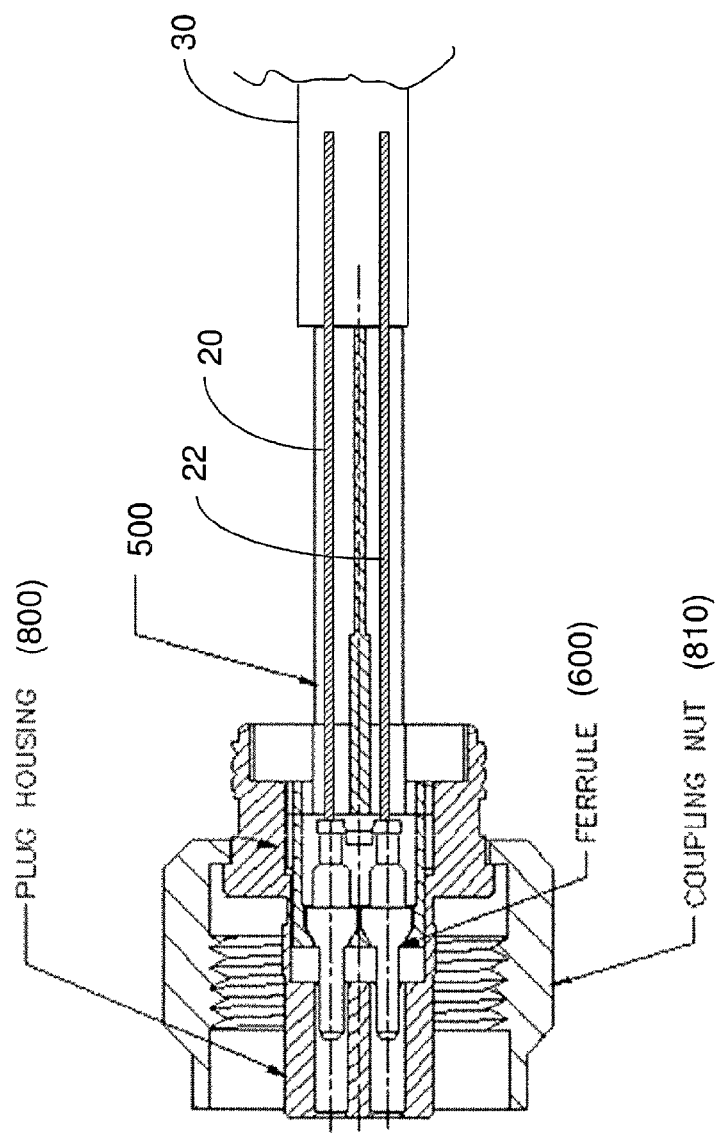
FIG. 10 is a cross-sectional view of the optical connector assembly of FIG. 9 in accordance with some embodiments.
Figure 11:
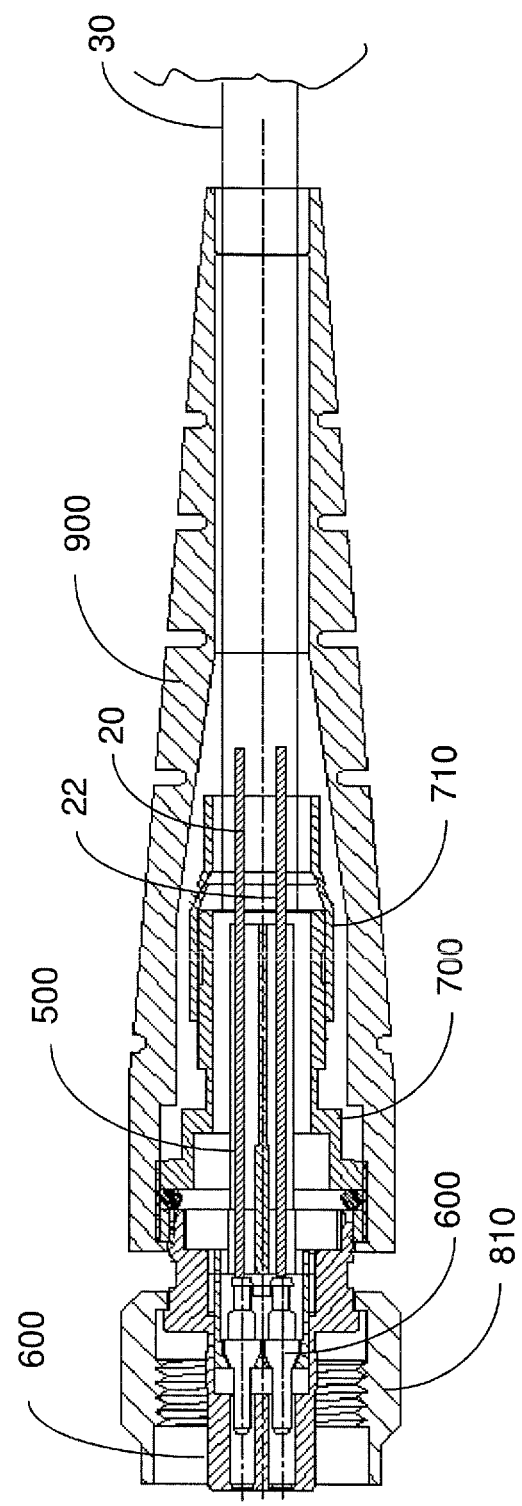
FIG. 11 is a cross-sectional view of the optical connector assembly of FIG. 10 in accordance with some embodiments.

FIG. 10 depicts the optical connector assembly shown in FIG. 9 inserted into a connector housing 700 that with a coupling nut 810. As illustrated in FIG. 11, and as described for various embodiments above, the assembly shown in FIG. 10 may then be inserted into connector housing 700 and secured together to form the optical connector. In addition, the support member 500 may be further secured to the optical fiber jacket 30 through attachment with crimp 710. Finally, a boot 900 may be installed to surround the connector assembly for added protection of the cable, and may be attached via any suitable method.

Suitable optical connector assemblies that decrease attenuation by preventing substantial bending in the optical fibers may be manufactured according to any suitable method. In some embodiments, a portion of an optical fiber jacket housing a plurality of optical fibers may be at least partially removed from contact with the plurality of optical fibers (e.g., by stripping parts of the jacket away from the fibers) so as to expose a region of the optical fibers for connection with a main optical fiber connector. A ferrule provided in connection with the main optical fiber connector is filled with an adhesive material (e.g., epoxy) for securing the optical fibers with the connector. In some cases, the exposed optical fibers are placed within corresponding channels of a support member. The optical fibers along with the support member are suitably connected with the ferrule and placed into contact with the adhesive material for securing the optical fibers to the ferrule. The support member also receives the optical fiber jacket, for example, in a manner where a front surface of the optical fiber jacket abuts a rear surface of the support member. Upon cure of the adhesive material within the ferrule so as to appropriately fix the optical fibers within the ferrule, an extraneous length of optical fiber remains protruding out the front side of the ferrule. The extraneous length of optical fiber is subject to a suitable number of processing steps where, for instance, the protruding amount of optical fiber is terminated (e.g., cleaved) and the surface including an optical fiber and ferrule is polished. After processing is completed on the front side, the optical fiber jacket, support member and ferrule is crimped together with a connector housing, adhering the assembly together as a unit.

In some embodiments, the optical fibers are placed in contact with the adhesive material within the cavity of the ferrule prior to engagement with the channels of the support member. Upon cure of the adhesive, the optical fibers and the ferrule may be suitably terminated (e.g., protruding fibers cleaved and the surface of the fibers and ferrule polished).

As described above, optical connector assemblies, in many cases, are exposed to extreme weather conditions and must continuously withstand a wide range of temperature fluctuation. In some instances, light is transmitted between opposing ends of optical fibers housed in an optical connector assembly where the optical fibers are exposed to a temperature range between about −40 C and about 85 C. In some embodiments, the optical connector assembly is exposed to a percentage of this range, such as for example, 60% of the −40 to 85 C range, 80% of the −40 to 85 C range, 90% of the −40 to 85 C range, or even a greater range than −40 to 85 C. The temperature which the optical fiber assembly is exposed may be cycled within the range of between about −40 C and about 85 C from a lower end to an upper end at least about 20-30 times, or even more. In some cases, this exposure may result in the optical fiber jacket which surrounds the optical fibers shrinking in any dimension (e.g., length, width, volume, etc.) up to 5% or more. Despite such exposure and the resulting shrinkage of the optical fiber jacket, the optical connector assembly is constructed to prevent substantial bending of the optical fibers within the assembly during exposure to the range of temperatures.

Reduction in attenuation of the optical fibers results in a reduction in the decibel (dB) change of a signal passing through the fibers. In some embodiments, signal traveling through multiple optical fibers of the optical connector assembly will fluctuate by less than 0.5 dB despite the above described environmental conditions. In some cases, the signal through the multiple optical fibers changes by less than 0.35 dB, less than 0.3 dB, less than 0.2 dB, or less than 0.1 dB. In contrast, for optical connector assemblies that do not reduce attenuation effectively by allowing macro-bending of optical fibers to occur within the connector housing, signal loss of up to 7-8 dB have been observed to occur.

While particular embodiments have been chosen to illustrate the invention, it will be understood by those skilled in the art that various changes and modifications can be made therein without departing from the scope of the invention as defined in the appended claims.

This invention is not limited in its application to the details of construction and the arrangement of components set forth in the following description or illustrated in the drawings. The invention is capable of other embodiments and of being practiced or of being earned out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art.

As one example, different features were discussed above in connection with different embodiments of the invention. These features may be used alone or in combination.

As another example, a member is not to be limited as unitary. For example, a support member may be a single unitary piece or could be multiple pieces.

For example, embodiments were described for cable connector assemblies incorporating both electrical and optical connectors. These assemblies may use similar components or components that perform similar functions. It should be appreciated that techniques for construction and operation of cable connector assemblies with optical connectors may be employed for electrical connector cable assemblies and vice versa.

For example, a multi-piece support member is described. In some embodiments, a support member may be made with fewer pieces described herein. For example, a component with a plastic hinge may be used. Alternatively, in some embodiments, fiber may be threaded through the support member before termination with ferrules.

As another example, though a support member integrated with a ferrule holder is described, it is not a requirement. The support member may be entirely separate or may be part of a different piece of the connector, such as the connector housing.

As a further example, it is not a requirement that channels have continuous walls over their entire length. Some breaks in the walls may not preclude the channels from serving the functions described herein.

As another example, a coupling nut is described as providing attachment between a cable connector assembly and an adapter. Any suitable attachment mechanism may be used. Other examples include latches, push/pull or snap connections.

Such alterations, modifications, and improvements are intended to be part of this disclosure, and are intended to be within the spirit and scope of the invention. Accordingly, the foregoing description and drawings are by way of example only.

What is claimed is:

1. An optical connector configured to make optical connections with each of a plurality of optical fibers, the connector comprising:
   a connector housing, the housing bounding a cavity, the housing having a first opening into the cavity and a second opening into the cavity;
   a support disposed within the cavity, the support comprising:
      a first portion comprising a plurality of ferrule receiving sections, the first portion facing the first opening;
      a second portion comprising a plurality of rigid, enclosed channels, each of the plurality of channels:
         having a first end adjacent a respective ferrule receiving section of the plurality of ferrule receiving sections and a second end facing the second opening, and
         being shaped to slidably hold a fiber of a plurality of fibers while constraining motion transverse to an axis of the fiber.

2. The optical connector of claim 1, wherein:
   the second portion further comprises a cable receiving portion adjacent the second ends of the plurality of channels.

3. The optical connector of claim 1, wherein:
   the first portion and the second portion comprise complementary engagement features adapted and configured to attach the first portion and the second portion.

4. The optical connector of claim 3, wherein:
   the first portion comprises a plurality of slots, each of the plurality of slots adapted to align with a channel of the plurality of channels when the first portion is attached to the second portion.

5. The optical connector of claim 3, wherein:
   the second portion comprises a first component and a second component.

6. The optical connector assembly of claim 1, wherein the first portion is separated from the second opening by more than 1.5 inches.

7. The optical connector assembly of claim 6, wherein:
   each of the plurality of channels has an inside diameter of 1.5 mm or less.

8. The optical connector assembly of claim 6, wherein:
   each of the plurality of channels is sized to constrain a fiber to a maximum bending with a bend radius of 8 mm or more.

9. An optical connector assembly comprising:
   a connector housing, the housing bounding a cavity, the housing having a first opening into the cavity and a second opening into the cavity;
   an optical fiber jacket secured to the connector housing;
   a plurality of optical fibers, each of the plurality of optical fibers having a region disposed within the jacket and an exposed region, extending from the jacket and disposed within at least a portion of the connector housing; and
   a support member disposed within the cavity and adjacent to the jacket, the support member comprising:

a ferrule holder facing the first opening; and
a portion, facing the second opening and integrally attached to the ferrule holder, comprising a plurality of channels, wherein an exposed region of each of the plurality of optical fibers is slidably held within a respective channel of the plurality of channels so as to prevent the exposed region of the plurality of optical fibers from substantial bending.

10. The optical connector assembly of claim 9, further comprising a multi-fiber ferrule within the ferrule holder.

11. The optical connector assembly of claim 9, further comprising a ferrule mounted in the support member.

12. The optical connector assembly of claim 10, wherein: the support member surrounds each of the plurality of optical fibers along the entire length between the ferrule holder and the optical fiber jacket.

13. The optical connector assembly of claim 9, wherein a surface of the support member abuts a surface of the optical fiber jacket.

14. The optical connector assembly of claim 9, wherein each of the plurality of optical fibers has an outer diameter of about 900 microns and each of the plurality of channels has an inside diameter of less than about 3 mm.

15. The optical connector assembly of claim 9, wherein the plurality of optical fibers comprises four optical fibers.

16. The optical connector assembly of claim 9, wherein the plurality of channels are constructed and arranged to prevent bending of the plurality of optical fibers to a bending radius of greater than 10 times an outer diameter of at least one optical fiber.

17. The optical connector assembly of claim 9, wherein the plurality of channels are constructed and arranged to prevent bending of the plurality of optical fibers to a bending radius of greater than about 9 mm.

18. The optical connector assembly of claim 10, wherein the support member further comprises a rear portion, the rear portion comprising the plurality of channels.

19. The optical connector assembly of claim 18, wherein the rear portion and the ferrule holder comprise a securing mechanism for securing the rear portion and the ferrule holder together after insertion of the plurality of optical fibers, terminated with ferrules, into the support member.

20. The optical connector assembly of claim 18, wherein the rear portion comprises first and second portions comprising a clam-shell arrangement.

21. The optical connector assembly of claim 9, wherein the connector housing is clamped on to the optical fiber jacket.

22. The optical connector of claim 1, in combination with a cable comprising a jacket and a plurality of optical fibers and a plurality of ferrules,
wherein:
the jacket is secured to the connector housing; and
the plurality of ferrules terminate respective optical fibers of the plurality of optical fibers; and
the plurality of optical fibers are disposed in respective ones of the plurality of rigid, enclosed channels.

23. The optical connector of claim 1, wherein:
the support member comprises a first portion and a second portion; and
the plurality of enclosed channels are bounded by the first portion and the second portion.

24. The optical connector of claim 23, wherein:
the support member is made of plastic.

25. The optical connector of claim 1,
wherein each of the plurality of channels constrains motion transverse to the axis of a fiber of the plurality of fibers as a result of an inside diameter of 1.5 mm or less.

26. The optical connector of claim 1, wherein:
the channels have a length on the order of 2 inches.

27. The optical connector of claim 1, wherein the optical connector is configured as an outdoor connector.

28. The optical connector of claim 27, further comprising a coupling nut attached to the housing.

29. The optical connector of claim 27, wherein the channels are sized such that signals through the plurality of optical fibers change by less than 0.2 dB when the connector is exposed to temperatures varying from −40 to 85 C.

30. The optical connector of claim 9, wherein:
the channels have a length on the order of 2 inches.

31. The optical connector of claim 9, wherein the optical connector is configured as an outdoor connector.

32. The optical connector of claim 31, further comprising a coupling nut attached to the housing.

33. The optical connector of claim 31, wherein the channels are sized such that signals through the plurality of optical fibers change by less than 0.2 dB when the connector is exposed to temperatures varying from −40 to 85 C.

* * * * *